United States Patent [19]

Hayashi et al.

[11] Patent Number: 4,847,827
[45] Date of Patent: Jul. 11, 1989

[54] OPTICAL INFORMATION RECORDING DISK

[75] Inventors: Ryutaro Hayashi; Yukio Kimura; Toshikazu Yoshino, all of Saitama, Japan

[73] Assignee: Pioneer Electric Corporation, Tokyo, Japan

[21] Appl. No.: 218,765

[22] Filed: Jun. 28, 1988

[30] Foreign Application Priority Data

Dec. 9, 1987 [JP] Japan .................................. 62-312666

[51] Int. Cl.⁴ ......................... G11D 15/32; G11B 7/24
[52] U.S. Cl. .................................. 369/284; 346/135.1; 369/286
[58] Field of Search ....................... 369/283, 284, 286; 346/135.1, 76 L

[56] References Cited

U.S. PATENT DOCUMENTS

| 4,504,842 | 3/1985 | Odawata | 369/284 |
| 4,720,826 | 1/1988 | Sugiyama et al. | 369/283 |
| 4,739,345 | 4/1988 | Namba et al. | 369/283 |

Primary Examiner—Steven L. Stephan
Attorney, Agent, or Firm—Sughrue, Mion, Zinn, Macpeak & Seas

[57] ABSTRACT

An optical information recording disk is formed by a pair of disk-like substrates with an inner and an outer annular spacer member disposed therebetween. The inner spacer member supports an inner circumferential portion of each of the disk-like substrates, and the outer spacer member supports an outer circumferential portion of each of the disk-like substrates. The spacer members and substrates thus define an interior space. The spacer members and substrates are fixed together by means of a thermosetting adhesive agent. A notched portion is formed in at least one of the space members so as to communicate the interior of the disk with the ambient atmosphere. Thus, during heating of the disk for purposes of joining the substrates and spacers by hardening the adhesive agent, air in the interior space in the disk can escape through the notched portion. After heating, the notched portion is filled with a sealing member such as a solid member or another adhesive agent.

18 Claims, 3 Drawing Sheets

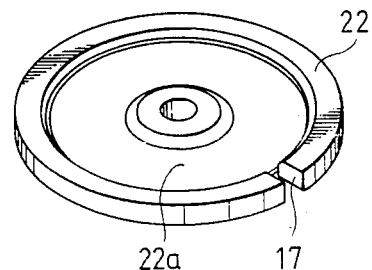
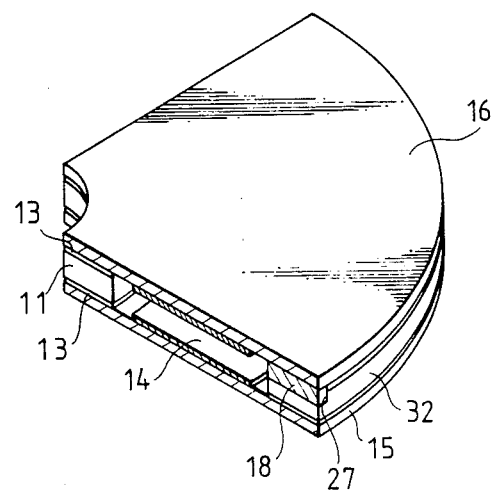
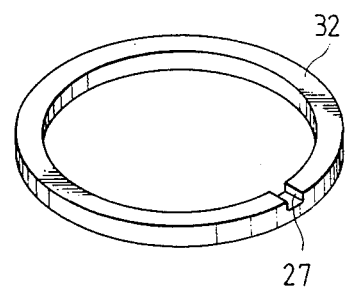

OPTICAL INFORMATION RECORDING DISK

BACKGROUND OF THE INVENTION

The present invention relates to an optical information recording disk, and in particular, to a so-called air-sandwich optical disk in which a signal recording layer faces a cavity inside the disk.

One type of air-sandwich optical disk is a write-once type formed by disk-like substrates (made of a plastic material such as PMMA or the like), signal recording layers (made of, for example, an organic pigment film and) carried on main surfaces of the disk-like substrates, and annular spacers on which the substrates are mounted so as to face each other. Such a disk is generally assembled using the method shown in FIGS. 1(a) through 1(f).

First, as shown in FIG. 1(a), a pair of ring-like or annular inner and outer circumferential spacers 1 and 2, respectively, are centered and fixed onto a positioning jig, and an adhesive agent 3 is applied to all substrate bearing surfaces of the spacers 1 and 2.

Next, as shown in FIG. 1(b), a substrate 5 carrying on its main surface a signal recording layer 4 is aligned with a central hole in the inner spacer 1 and is mounted on the spacers 1 and 2 with the signal recording layer 4 facing the spacers. The substrate 5 is pressed downward slightly so that any gaps between the substrate 5 and each of the spacers 1 and 2 are filled with the adhesive agent 3.

Next, as shown in FIG. 1(c), the substrate 5, together with the spacers 1 and 2, is turned over and fixed onto the jig, and the adhesive agent 3 is applied to the spacers 1 and 2 in the same manner as in the first step shown in FIG. 1(a).

As shown in FIG. 1(d), another substrate 6 is then mounted on the spacers 1 and 2 in the same manner as in the step shown in FIG. 1(b). The assembly is left for a predetermined time at room temperature. Then, the assembly is heated for two hours at 60° C., and left again for a predetermined time at room temperature so that the adhesive agent hardens.

After hardening of the adhesive agent, as shown in FIG. 1(e), the outermost circumferential portion of the disk, that is, the circumferential portions of the disk-like substrates 5 and 6 and the outer circumferential surfaces of the outer spacer 2, are finished to form a uniform radius from the center of the disk.

Then, as shown in FIG. 1(f), the disk is finished into an optical disk 7.

The air-sandwich optical disk is formed using acrylic plates of PMMA or the like as the substrates, and using materials such as cyanine organic pigment films or metal thin films of tellurium as the recording films. The adhesive agent must be such that it does not damage the recording films, yet has a suitable adhesive strength with the acrylic plates. The adhesive agent must also seal the disk so that moisture cannot get into the inside space, and must have a viscoelasticity so as to accommodate warp (e.g. from water absorption of the acrylic plates). One such adhesive agent is a thermosetting polyurethane. Accordingly, in the joining step shown in FIG. 1(d), the whole disk is heated, so that the air in the interior space expands. The expanding air causes transformation of the substrates. The expanding air also penetrates and enters the adhesive agent layer (which has not yet hardened) and lowers the adhesive strength. To prevent transformation of the substrates and mixture of air bubbles in the adhesive agent layer from occurring, an air hole 10 is formed to allow the expanding air to escape (see Japanese Utility Model Unexamined Publication No. 57-149535), as shown in FIG. 2. The air hole 10 is shown in the outer circumferential spacer 2, but it could be provided in the substrates or the inner circumferential spacer 1. It serves to equalize the atmospheric pressure between the air in the interior space and the air outside the disk so as to prevent warping of the substrates owing to a change in humidity, or the like.

To ensure that only air passes through the air hole 10 (i.e. to prevent dust or the like from entering), a filter covers the hole. However, even when such a filter is used, ozone, sulfurized gas, and the like, may enter through the filter from the ambient air. The entering gases will damage the signal recording films. For example, a signal recording film made of organic pigment films can be decolorized, and a metal film signal recording film can be oxidized, rendering it impossible to maintain desired properties of the signal recording film.

In addition, in the conventional air-sandwich optical disk, the thickness of the interior space, that is, the thickness of the spacers, must be sufficiently large so that the air hole can be formed in the spacers. However, thin optical disks have been developed with the miniaturization of recording/reproducing apparatus. For example, in an optical disk which is 3 mm thick and in which each substrate is 1.2 mm thick, a sufficiently large air hole cannot be formed because each spacer is only 0.6 mm thick, whether or not the air hole is formed in the spacers. Further, in some cases the air hole may be filled up with adhesive agent when the spacers and the substrates are adhered to each other. In such cases, the air hole cannot function as a path for expanding gas.

SUMMARY OF THE INVENTION

It is therefore an object of the present invention to provide an air-sandwich optical disk which can easily be produced and air-tightness of the inside space can be maintained.

To attain the above object, according to the present invention, the recording disk includes a pair of disk-like substrates at least one of which has a signal recording layer formed thereon, and annular spacers for respectively bearing inner and outer circumferential portions of both disk-like substrates. The substrates are thus positioned parallel to each other, and together with the spacers, define an interior space into which the signal recording layer faces. The recording disk also includes an adhesive agent for fixedly joining the disk-like substrates and annular spacers together, a notched portion formed in at least one substrate bearing surface of at least one of the annular spacers in a manner so that the notched portion extends through the spacer so as to make the interior space communicate with the exterior of the disk, and a seal member for filling in the notched portion.

BRIEF DESCRIPTION OF THE DRAWINGS

The above and other objects, features and advantages of the present invention will be apparent from the following detailed description taken in connection with the accompanying drawings, in which:

FIGS. 3, 5 and 7 are partially cut-away perspective views showing first, second and third embodiments, respectively, of the optical disk according to the present invention; and FIGS. 4, 6 and 8 are perspective views showing the spacers used in the optical disks of FIGS. 3, 5 and 7, respectively.

DESCRIPTION OF THE PREFERRED EMBODIMENTS

Three preferred embodiments of the optical disk according to the present invention will be described with reference to the drawings.

Figure 3:
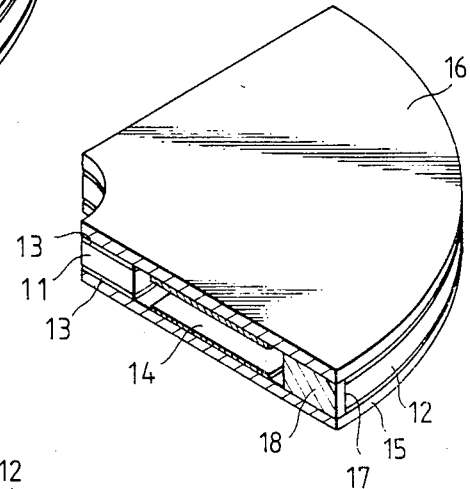

FIG. 3 shows a first embodiment of the optical disk according to the present invention. The disk is formed by a pair of substrates 15 and 16 which sandwich inner and outer annular spacers 11 and 12 therebetween, with the substrates and spacers being held together by adhesive layers 13. Signal recording layers 14 are provided on the substrates so as to face an interior space defined by the substrates 15 and 16 and the spacers 11 and 12. The substrates 15, 16 inner spacer 11, adhesive layers 13, and recording layers 14 are formed similar to those in FIGS. 1(a) through 1(f).

Figure 4:
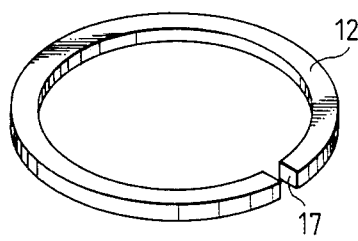

The outer circumferential spacer 12 is formed with a notched portion 17 which extends (e.g. radially) from the spacer's inner circumferential surface to its outer circumferential surface. The notched portion 17 is filled with a seal member 18 (e.g. a hardened adhesive agent) for isolating the interior space from the outside (ambient atmosphere). The adhesive agent is 18 is of a type which is fluid before use but hardens at room temperature or by heat, for example, a urethane adhesive agent. It is very important that the adhesive agent be of a type that does not harm the signal recording layers. The outer circumferential spacer 12 of FIG. 3 is shown in isolation in FIG. 4. The outer spacer 12 is formed such that a part of an annular body is cut-off entirely (to form the notched portion 17) between its substrate bearing surfaces by cutting or the like to form a C-shaped spacer 12.

Figure 5:
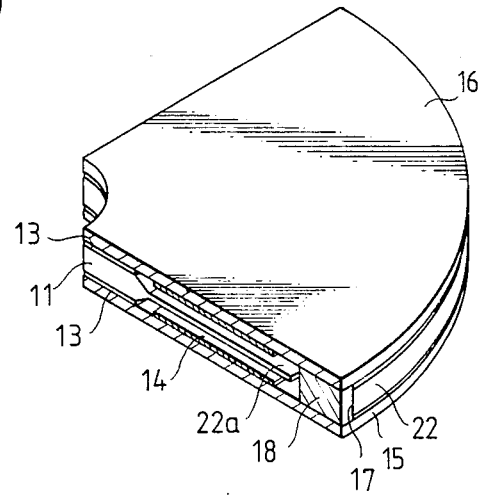

FIG. 5 shows a second embodiment of the inventive optical disk, in which like parts are given like reference numerals. In the second embodiment, an outer spacer 22 having a disk-like portion 22a for reinforcing the disk and for partitioning the interior space is provided between substrates 15 and 16. Inner spacer 21 is integrally joined with the reinforcing portion 22a. The substrates 15, 16 and spacers 21, 22 are joined by adhesive agent layers 13. Notched portion 17 of the outer spacer 22 is filled with an adhesive agent 18 functioning as a seal member. The notched portion 17 is formed in the spacer 22, as best shown in FIG. 6, so as to extend entirely through the outer spacer 22, circumferentially as well as radially.

FIG. 7 shows a third embodiment of the inventive optical disk, in which like parts are given like reference numerals. In the third embodiment, a notched portion 27 is formed so as to extend through outer spacer 32 yet leave a portion of the spacer 32 still circular. The notched portion 27 is filled with an adhesive agent 18 which functions as a seal member. As best shown in FIG. 8, the annular outer circumferential spacer 32 is only partially notched to form only a groove in one of the substrate bearing surfaces of the spacer 32, rather than passing completely circumferentially through the spacer.

Figure 1A:
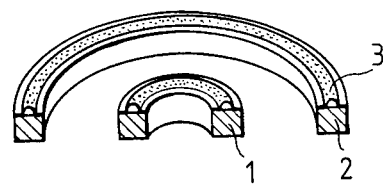
FIGS. 1(a) through 1(f) are partially cut-away perspective views for explaining assembling steps of an optical disk for purposes of background.
Figure 1B:
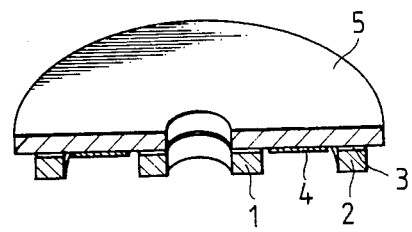
Figure 1C:
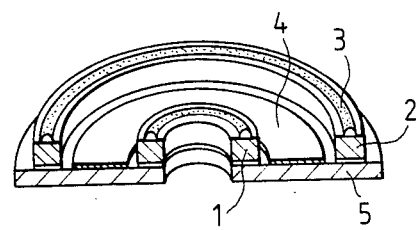
Figure 1D:
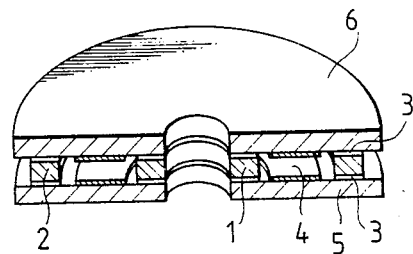
Figure 1E:
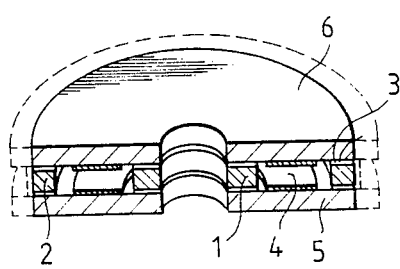
Figure 1F:
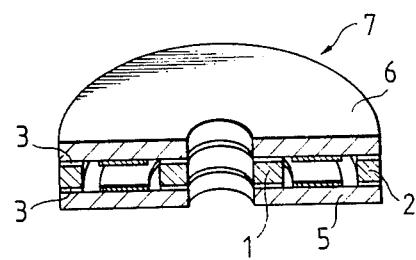
Figure 2:
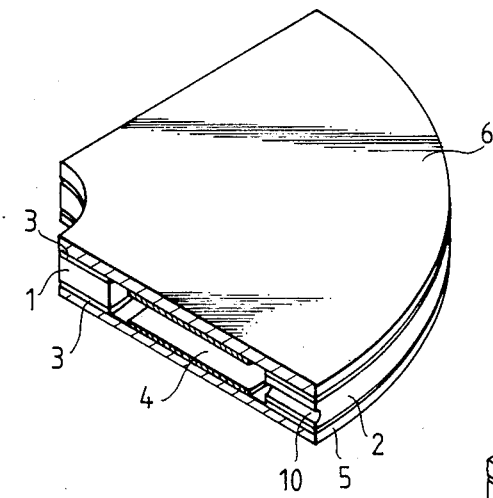
FIG. 2 is a partially cut-away perspective view showing an optical disk with an air hole formed thereon for purposes of background.

The assembling steps of each of the above-mentioned embodiments of the optical disk are almost the same as those shown in FIGS. 1(a) through 1(f), except for the following steps. That is, the former (invention) is different from the latter (FIGS. 1-2) in that the urethane adhesive agent 13 (3) is applied to the spacers around their whole circumferences except for the notched portion 17 or 27 and then hardened in the step of FIG. 1(c). The notched portion 17 or 27 of the outer circumferential spacer 12, 22 or 32 is filled with the adhesive agent 18 of, for example, epoxy, after the substrate 16 (6) has been adhered to the spacers 11 (1) and 12, 22 or 32 (2). The epoxy is left for a predetermined time at room temperature to be hardened. Then, the outer-circumference cutting step (FIG. 1(e)) to make the exterior of the disk uniform is carried out. In the above-mentioned sealing steps, the epoxy adhesive agent 18 remains in a liquid phase before filling so that it can be poured into the notched portion through a pouring nozzle or the like. The epoxy becomes a seal member upon hardening. Instead of using a hardened adhesive agent as the seal member 18, a plug member having a shape corresponding to the notched portion may be used. To do so, the plug member is coated with an adhesive agent and then fitted into the notched portion.

On the other hand, it is also possible to join the substrates and the spacers by an ultrasonic welding.

In the above assembling process, the air escaping from the interior space to the outside when the substrates 15 and 16 are joined to the spacers is allowed to come out through the as yet unsealed notched portion 17 or 27. Accordingly, it is possible to avoid the transformation of the substrates due to expansion of the inside air caused by heating when a thermosetting adhesive agent is used.

The previous description has been with respect to the case where the notched portion is formed in the outer circumferential spacer. Alternatively, the disk can be formed (e.g. when at least one of the substrates has a central aperture as shown in the drawings) so that the notched portion can be formed in the inner circumferential spacer, in the same way that it is formed in the outer circumferential spacer. This is now shown in the drawings for purposes of simplicity. The notch in the inner spacer is sealable with a seal member such as an adhesive agent or plug member. Other variations will be evident to one of ordinary skill in the art. For example, an optical disk conceivably may be constructed with only one circumferential spacer, e.g. if the substrates are formed without central apertures.

As described above, according to the present invention, a notched portion is formed in at least one substrate bearing surface of a substantially annular spacer in an air-sandwich optical disk and the notched portion is filled with a seal member. It is therefore possible to make an interior space in the disk communicate with the open air when the substrates and the spacers are adhered with one another. Further, the notched portion is sealed after the substrates and the spacers have been fixed together. Thus, moisture, gas, etc. which are harmful to the signal recording layers formed of an organic pigment or of a metal material can be prevented from getting into the inside space.

What is claimed is:

1. An optical information recording disk comprising:

a pair of substrates at least one of which has a signal recording layer formed thereon;

spacer means for bearing circumferential portions of said substrates on first and second substrate bearing surfaces of said spacer means so that said substrates together with said spacer means form an interior space;

means for fixedly joining said substrates and said spacer means by heating the disk;

means for defining a notched portion in one of said first and second substrate bearing surfaces of said spacer means so that said notched portion extends through said spacer means to communicate the interior space with atmosphere outside the disk; and seal means for filling in said notched portion after said disk has been heated to form an airtight seal.

2. The recording disk of claim 1, wherein said substrates are disk-like in shape and said spacer means comprises an outer annular spacer for bearing outer circumferential portions of said substrates, and said notched portion is defined in said outer annular spacer.

3. The recording disk of claim 1, wherein said substrates are disk-like in shape and said spacer means comprises an inner annular spacer for bearing inner circumferential portions of said substrates, and said notched portion is defined in said inner annular spacer.

4. The recording disk of claim 1, wherein said substrates face each other and said signal recording layer is disposed facing the interior space.

5. The recording disk of claim 1, wherein said seal means comprises a solid member.

6. The recording disk of claim 1, wherein said seal means comprises an adhesive agent.

7. The recording disk of claim 1, wherein said means for fixedly joining is a thermosetting adhesive agent.

8. The recording disk of claim 1, wherein said notched portion extends radially through said spacer means.

9. The recording disk of claim 1, wherein said notched portion extends from said first substrate bearing surface of said spacer means to said second substrate bearing surface of said spacer means.

10. The recording disk of claim 1, wherein said notched portion extends through said first substrate bearing surface of said spacer means but not said second substrate bearing surface of said spacer means.

11. The recording disk of claim 2, wherein said spacer means further comprises an inner annular spacer for bearing inner circumferential portions of said substrates, and said spacers have means for reinforcing disposed therebetween.

12. The recording disk of claim 1, wherein said substrates are disk-like in shape.

13. A method for forming an optical information recording disk comprising the steps of:

disposing first and second substrates on, and joining the substrates to, respective first and second substrate bearing surfaces of spacer means for maintaining a predetermined distance between said substrates, said spacer means having a notched portion defined in at least one of said first and second substrate bearing surfaces, said notched portion extending through said spacer means so as to communicate an interior space formed by said substrates and spacer means with a space outside of the disk, wherein said substrates are joined to said spacer means by heating the disk; and sealing said notched portion to form an airtight seal after the heating.

14. The method of claim 13, wherein prior to the joining, said first and second substrate bearing surfaces are coated with a thermosetting adhesive agent.

15. The method of claim 13, wherein said notched portion is sealed using a solid sealing member.

16. The method of claim 13, wherein said notched portion is sealed using an adhesive agent.

17. The method of claim 13, wherein said substrates are disk-like in shape and said spacer means includes an annular member for supporting a radially inner portion of said first and second substrates, and said notched portion is formed in said annular member.

18. The method of claim 13, wherein said substrates are disk-like in shape and said spacer means includes an annular member for supporting a radially outer portion of said first and second substrates, and said notched portion is formed in said annular member.

* * * * *